United States Patent [19]

Rothschild

[11] 4,025,088

[45] May 24, 1977

[54] FOLDING WHEELCHAIR

[76] Inventor: Barbara G. Rothschild, 2134 Springdale Drive, Columbus, Ga. 31906

[22] Filed: Apr. 13, 1976

[21] Appl. No.: 676,560

[52] U.S. Cl. .................................. 280/644; 280/42; 280/649; 280/650; 297/45; 297/DIG. 4

[51] Int. Cl.² ............................................ B62B 7/08

[58] Field of Search ............ 280/42, 644, 641, 642, 280/647, 649, 650, 242 WC, DIG. 10; 180/DIG. 3, 6.5; 297/40, 45, 44, 56, DIG. 4

[56] References Cited

UNITED STATES PATENTS

| | | | |
|---|---|---|---|
| 95,856 | 10/1869 | Vaill | 297/40 |
| 984,939 | 2/1911 | Krile | 297/45 |
| 1,668,213 | 5/1928 | Landine | 297/40 X |
| 1,963,835 | 6/1934 | Deland | 297/44 |
| 2,104,255 | 1/1938 | Garbaccio | 297/45 |
| 2,669,289 | 2/1954 | Usher et al. | 297/45 X |
| 3,390,893 | 7/1968 | MacLaren | 280/644 X |

FOREIGN PATENTS OR APPLICATIONS

| | | | |
|---|---|---|---|
| 388,984 | 3/1933 | United Kingdom | 280/642 |

*Primary Examiner*—Joseph F. Peters, Jr.
*Assistant Examiner*—Michael J. Forman
*Attorney, Agent, or Firm*—D. Paul Weaver

[57] ABSTRACT

A folding wheelchair of rugged but relatively light-weight construction has the ability to collapse in the fore and aft directions and laterally. The chair back and arm rests are also foldable to minimize the height of the collapsed chair which is then highly compact. When the chair is unfolded for use, pairs of pivot elements on the foldable leg members of the chair form stops for the arm rests and chair back. Adjustable foot rests are provided on the forward leg members of the chair.

11 Claims, 6 Drawing Figures

FIG 4
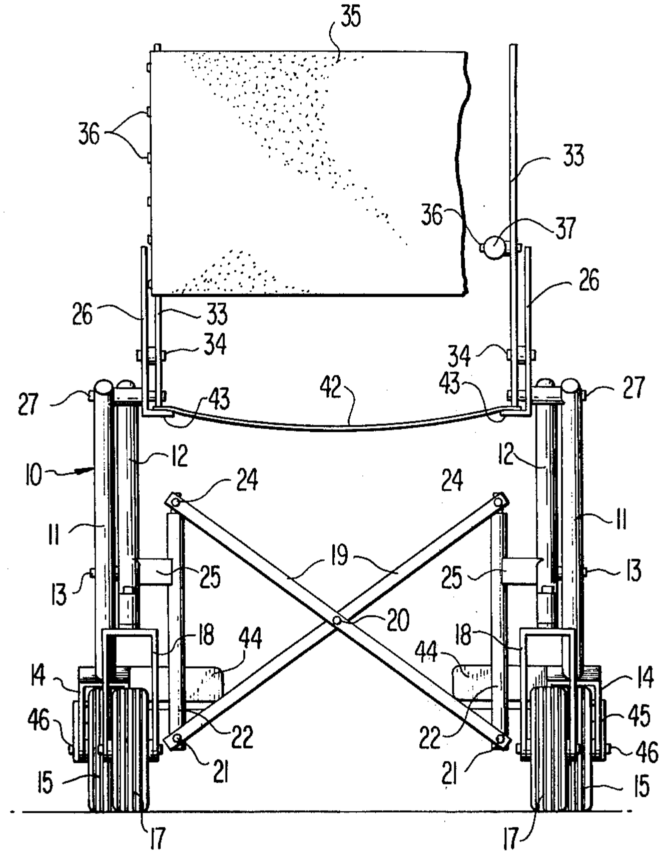
FIG 5
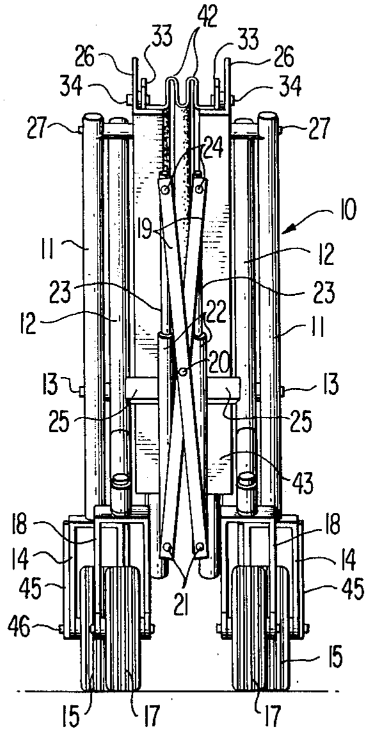
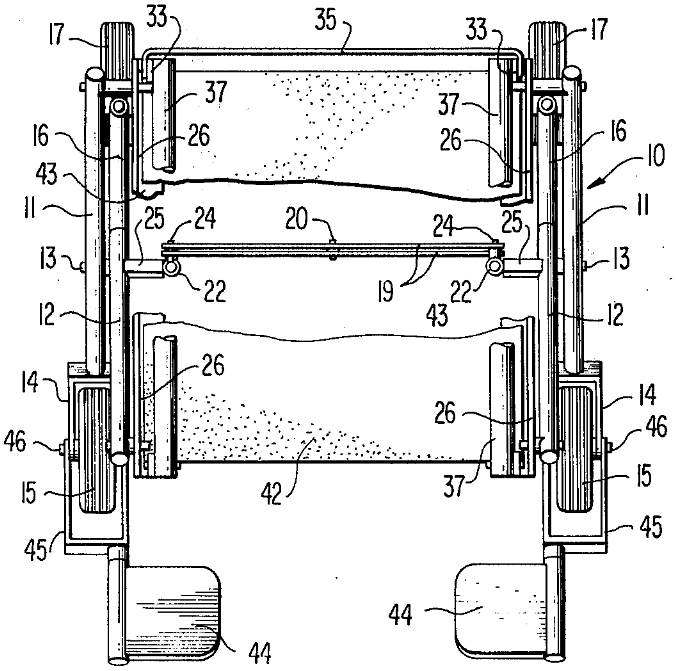
FIG 6

FOLDING WHEELCHAIR

BACKGROUND OF THE INVENTION

Folding wheelchairs are known in the prior art and some examples of the patented prior art are shown in U.S. Pat. Nos. 3,390,893; 984,339; 2,104,255 and 1,963,835.

The objective of the invention is to improve upon the prior art providing a folding wheelchair which is more compact and lighter than conventional chairs and therefore easier and more convenient to transport and to use on a temporary or regular basis. The wheelchair constructed according to the invention, when collapsed, is adapted to fit into the trunk of small automobiles.

A further feature of the invention resides in the provision of positive-acting cam tracks at the opposite sides of the chair having pivotal connections with the chair back and arm rests and with one pair of chair leg members, the cam tracks being slidably connected with the second pair of leg members to which the laterally folding telescoping brace frame means of the wheelchair is attached.

Other features and advantages of the invention will become apparent during the course of the following description.

BRIEF DESCRIPTION OF DRAWING FIGURES

FIG. 4 is a rear elevation, partly broken away, of the fully opened chair.

FIG. 5 is a rear elevation of the fully folded chair.

FIG. 6 is a plan view, partly broken away, of the chair when fully opened.

DETAILED DESCRIPTION

Figure 1:
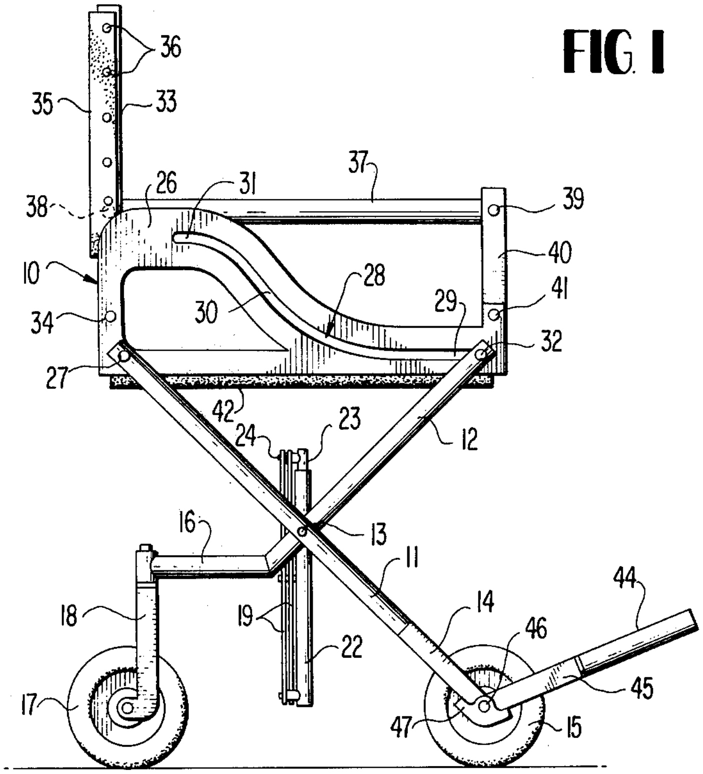
FIG. 1 is a side elevation of a folding wheelchair embodying the invention in a fully open position of use.

Referring to the drawings in detail wherein like numerals designate like parts, a wheelchair designated by the numeral 10 in its entirety comprises opposite side pairs of front and rear chair leg members 11 and 12, the respective front and rear chair leg members in the side pairs being pivotally interconnected intermediate their ends by a suitable pivot element 13. It may be seen that the pivoted leg members 11 and 12 at each side of the wheelchair form a modified X-frame which is extendable to the open position of FIG. 1 wherein the leg members 11 and 12 are substantially at right angles, and collapsible to the closed position of FIG. 3 wherein the leg members define an acute angle.

Each forward leg member 11 is straight in formation and carries a fork 14 at its forward end between the sides of which a non-castered forward wheel 15 is journaled for free rotation. Each rear leg member 12 has a straight upper portion above and forwardly of the pivot 13 and a rearwardly projecting relatively short lower portion 16 below the pivot 13 which is horizontal, FIG. 1, when the wheelchair is fully opened for use. The rear of each extension 16 carries a castered rear wheel 17 for the chair journaled in a yoke or fork 18. Thus, the wheelchair is rendered steerable through its rear castered wheels.

The paired opposite side leg members 11 and 12 are joined through a laterally collapsing brace frame consisting of two crossed straight bar members 19 pivotally interconnected near their longitudinal centers by a pivot element 20 to form an X-frame or brace means. The lower ends of bars 19 are pivoted at 21 to a pair of parallel vertical tubes 22 whose upper ends receive telescopically extensible rods 23 having their upper ends pivotally secured at 24 to the tops of bar members 19. In this manner, a laterally foldable or collapsible extensible X-frame is provided between the opposite side leg members 11 and 12 and the operation of this structure is most clearly depicted in FIGS. 4 and 5. As the chair is folded laterally, FIG. 5, the rods 23 extend from the tubes 22 and the latter remain parallel while the pivoted members 19 form small acute angles and approach parallelism. When the chair is fully extended laterally, FIG. 4, the pivoted bar members 19 are arranged at much greater angles to the vertical and the rods 23 retract into the tubes 22 which are relatively fixed.

Figure 2:
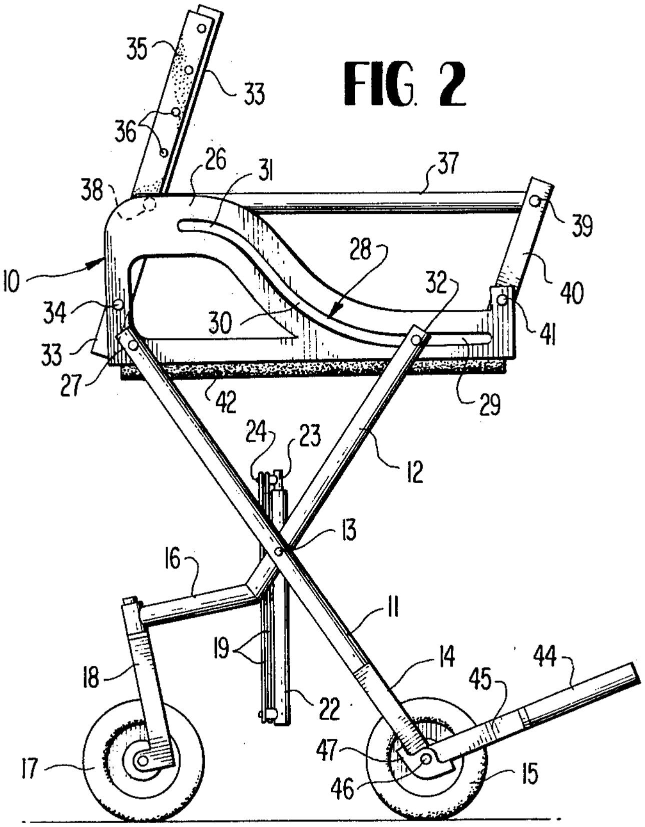
FIG. 2 is a further side elevation of the wheelchair at the beginning of the folding operation.
Figure 3:
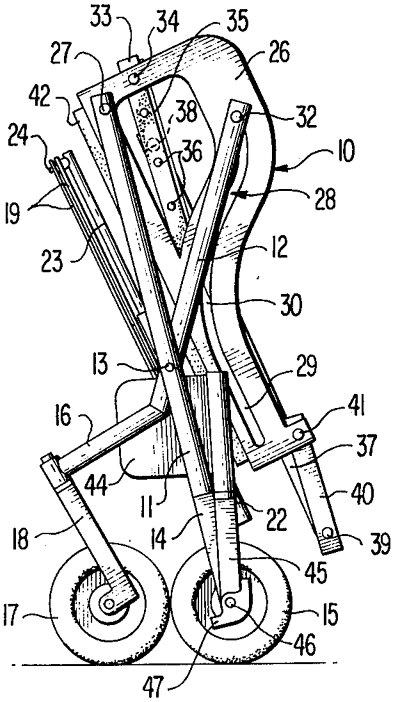
FIG. 3 is a side elevation of the fully folded wheelchair.

In this latter connection, the tubes 22 are rigidly joined to block elements 25 which in turn are rigidly secured to the adjacent rear leg members 12, whereby the entire lateral X-brace unit composed of the elements 19, 22 and 23 is rigid with the leg members 12 and pivots with these leg members on the axes of pivot elements 13 relative to the front leg members 11 whenever the chair is folded or unfolded longitudinally, FIGS. 2 and 3. That is to say, the angular relationship of the lateral folding X-brace unit relative to the leg members 12 is fixed, but varies relative to the leg members 11 during fore and aft folding of the chair as can be readily seen in FIGS. 2 and 3.

The wheelchair further comprises a pair of side vertical cam track frames or plates 26 immediately inwardly of leg members 12, FIGS. 4 and 6, and pivoted near their lower rear corners at 27 to the tops of front leg members 11. The plates 26 each have an elongated cam track slot 28 formed therethrough which has a frontal short horizontal section 29, an intermediate curved upwardly sloping section 30, and a reversely curved top section 31. Follower pin elements 32 carried by the tops of leg members 12 are received movably in the cam track slot 28 and when the chair is folded in the fore and aft direction, FIGS. 2 and 3, the elements 32 pass rearwardly through the straight slot sections 29 and enter the sloping slot sections 30 to thereby force downward pivoting of the plates 26 about the axes of pivot elements 27 to the ultimate steeply inclined position of the plates 26 shown in FIG. 3. Simultaneously, the pairs of leg members 11 and 12 are drawn toward their relative positions of near parallelism or acute angular positions depicted in FIG. 3. This renders the structure very compact fore and aft as well as in the vertical or height direction. It should be understood that the fore and aft folding operation, as described, is an independent operation from the lateral folding operation shown in FIGS. 4 and 5 and previously described. Customarily, the wheelchair would be folded fore and aft or longitudinally and then folded laterally or transversely in a separate operation.

Additionally, the wheelchair comprises a folding backrest having side bars 33 whose lower ends are pivotally secured at 34 to the side plates 26, somewhat above the pivots 27. The backrest includes a body portion 35 of flexible material, such as fabric or plastic material suitably attached at its opposite sides as by fasteners 36 to the bars 33.

Armrest bars 37 have their corresponding rear ends pivoted at 38, FIG. 4, to the backrest side bars 33 and have their forward ends pivoted at 39 to vertically swingable armrest links 40 whose lower ends are pivoted at 41 to the side vertical plates 26 at the forward ends of the latter. A parallelogram linkage is thus formed at each side of the wheelchair including the elements 33, 37 and 40.

As shown in FIG. 2, the seat back and armrests fold forwardly as a unit independently of the fore and aft folding of the scissors-like leg members 11 and 12 and the associated plates 26 having the cam track slots, and independently of the lateral folding or collapsing means shown in FIGS. 4 and 5.

The seat proper of the wheelchair comprises a flexible panel 42 of the same material as the backrest portion 35 and suitably attached to inturned right angular bottom flanges 43 of cam track side plates 26.

A further feature of the invention which renders the wheelchair stable in its open position of use, FIG. 1, is the utilization of the two pin elements 32 carried by the tops of leg members 12 as stops when these elements engage the forward ends of cam track slot sections 29. The pin elements 32, FIG. 2, move away from the forward slot ends during the folding operation, FIGS. 2 and 3. Similarly, the inner ends of the two pivot elements 27, FIG. 4, serve as limit stops for the two pivoted side bars 33 of the seat back so that the latter cannot swing counter-clockwise, FIG. 1, beyond the normal upright use position. During folding of the seat back, the lower ends of the bars 33 swing away from the stops 27 and the stops do not interfere with the folding of the seat back.

Substantially conventional footrests 44 are provided on the wheelchair at the lower ends of leg members 11 and the footrests are carried by yokes 45 which are pivoted to the axles 46 of front wheels 15 and have attached stop elements 47 to limit the downward pivoting of the footrests in their active use positions, as shown. The footrests 44 are also pivotally mounted on their yokes 45 so that they can be turned upwardly to vertical positions of non-use when the chair is folded or collapsed, FIG. 3. As can be seen in this figure, the footrests will enter between the folded leg members of the chair and the transverse brace means 29 and side plates 26.

By virtue of the described arrangement, the wheelchair may be folded into a much more compact form than prior art devices of a broadly similar character. With reference to FIGS. 3 and 5, the scissors-like leg members 11 and 12 are closed to a very narrow configuration fore and aft with the front and rear wheels 15 and 17 in contact. This action forces the cam track side plates 26 forwardly and downwardly on their pivots 27 to lie between the folded leg members 11 and 12 and to project only slightly thereabove and slightly forwardly, FIG. 3. The seat back 33-35 and armrests 37 fold forwardly between and inside of the side plates 26 and then pivot downwardly with the two side plates on which the back and armrest means are bodily mounted. The arrangement places the collapsed back and armrests in a near vertical position within the other elements, as shown in FIG. 3. Finally, by virtue of the described extensible lateral X-frame means 19-22-23, the chair is collapsed laterally, FIG. 5, to a very compact form for placement in a closet, car trunk or the like, or rolling to a new location.

In order to initiate the fore and aft folding operation which draws the leg members 11 and 12 toward parallelism, it is merely necessary to grasp and pull upwardly on the two backrest bars 33. When the weight of the chair is lifted in this manner from the wheels, gravity will assist in moving them together, FIG. 2. The follower pins 32 will move rearwardly in the horizontal slot sections 29, and when the intermediate curved slot sections 30 are encountered, the weight of the side plates 26 will assist the elements 32 in their passage to the rear ends of the cam track slots.

To collapse the chair laterally, the two pivot points 24 are merely drawn upwardly, and downward pressure on these two points will spread the chair laterally. Following this, while standing behind the chair, the two backrest bars 33 are grasped and pulled rearwardly or toward the user until the chair opens in the fore and aft direction. When fully opened, as in FIG. 1, the chair is positively locked by engagement of the elements 32 in the forward closed ends of slots 28 and by the interaction of the elements 27 with the lower ends of backrest bars 33.

A slight variant in the construction, not shown in the drawings, is that a pair of tube members may be substituted for the solid bars 33 of the backrest, and in lieu of the fasteners 36, tubular hems or sleeves at the opposite ends of the backrest body 35 may simply be telescoped over the tubular backrest bars. The tops of the bars may be capped with rubber hand grips for convenience and neatness.

The advantages of the invention should now be clearly apparent to those skilled in the art without further discussion.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A folding wheelchair comprising crossed pivotally connected forward and rear wheeled leg members at opposite sides of the wheelchair, laterally folding and extensible interconnecting means for said leg members at opposite sides of the chair and extending therebetween laterally of the chair, whereby the opposite side leg members may be separated laterally to open the chair for use and moved together laterally to collapse the chair to a non-use laterally narrow form, a chair seat including substantially vertical side plates having inclined cam track means, for guiding the movement of the upper ends of the rear leg members corresponding end portions of the side plates pivoted to corresponding upper ends of the forward leg members at opposite sides of the chair, corresponding upper ends of the rear leg members at opposite sides of the chair being movably engaged with said inclined cam track means of said side plates, whereby folding of the crossed leg members at opposite sides of the chair to collapse the chair fore and aft will force said side plates and chair seat to pivot downwardly to a near vertical position between and substantially within the confines of said forward and rear leg members at the opposite sides of the chair, and interconnected independently foldable back and arm rest means pivotably mounted on said side plates, whereby the back and arm rest means may fold forwardly and downwardly between and substantially within the confines of the side plates and opposite side leg members.

2. A folding wheelchair as defined by claim 1, wherein the laterally folding and extensible interconnecting means comprises a laterally collapsible X-frame brace having corresponding side parts fixedly joined to the rear leg members at opposite sides of the chair and being bodily carried by the rear leg members and pivoting therewith on the pivot axes of the crossed forward and rear leg members when the chair is opened or folded in the fore and aft direction.

3. A folding wheelchair as defined by claim 2, and said X-frame brace comprising a pair of crossed pivoted scissor-like brace bars, a pair of side upright tubes fixedly joined to said rear leg members, extensible and retractable rods engaged telescopically in said tubes and pivotally connected with corresponding ends of said scissor-like brace bars, the other corresponding ends of the scissor-like brace bars pivoted to adjacent ends of said tubes, whereby during lateral folding of the chair said rods may extend from said tubes to permit lateral folding of said scissor-like brace bars to a narrow compact form between the opposite side leg members of the chair.

4. A folding wheelchair as defined by claim 1, and said chair seat further including a flexible seat panel having its opposite sides secured to the lower longitudinal edge portions of said side plates.

5. A folding wheelchair as defined by claim 4, and said inclined cam track means comprising laterally aligned slots formed through said side plates, and follower elements on the tops of the rear leg movably engaging in said slots.

6. A folding wheelchair as defined by claim 5, and said slots having forward straight sections terminating near the forward ends of the side plates, intermediate curved upwardly sloping sections, and rear reversely curved top sections terminating near the tops of the side plates and somewhat forwardly of the pivotal connections between the side plates and said forward leg members.

7. A folding wheelchair as defined by claim 5, and said slots having forward terminals within and near the forward ends of said side plates, said forward terminals forming limit stops for the movement of said follower elements in one direction.

8. A folding wheelchair as defined by claim 1, and said foldable back and arm rest means comprising side backrest bars pivoted intermediate their ends to rear end portions of the side plates, longitudinal arm rest bars having rear ends pivoted to said side backrest bars and extending forwardly thereof near the tops of said side plates, and forward parallelogram links pivotally interconnecting forward ends of the arm rest bars and said side plates, whereby said back and arm rest means may fold forwardly and downwardly relative to said side plates and may also fold forwardly and downwardly with the side plates relative to and between the opposite side leg members.

9. A folding wheelchair as defined by claim 8, and said foldable back and arm rest means further comprising a flexible backrest panel extending between and connected to said side backrest bars.

10. A folding wheelchair as defined by claim 8, and pivot elements interconnecting the tops of the forward leg members with rear lower corner portions of said side plates and forming limit stops for the lower ends of said side backrest bars when the latter are turned in one direction on their pivots relative to the side plates.

11. A folding wheelchair as defined by claim 1, and footrest means pivotally secured to the lower ends of said forward leg members at opposite sides of the wheelchair, said footrest means being pivoted on two right angular axes relative to said forward leg members so that the footrest means may be folded within the confines of the opposite side leg members of the wheelchair.

* * * * *